(12) United States Patent
Miller et al.

(10) Patent No.: US 6,556,662 B1
(45) Date of Patent: Apr. 29, 2003

(54) METHOD AND APPARATUS FOR PROVIDING DIALED NUMBER VERIFICATION

(75) Inventors: Deborah H. Miller, Washington, DC (US); Timothy D. Casey, McLean, VA (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/564,879

(22) Filed: May 4, 2000

(51) Int. Cl.[7] .................................................. H04M 1/64
(52) U.S. Cl. ................ 379/67.1; 379/88.16; 379/88.22; 379/211.01
(58) Field of Search .............................. 379/70, 77, 84, 379/88.07, 88.08, 88.11, 88.19, 88.2, 67.1, 76, 88.16, 88.18, 211.01, 212.01, 88.22

(56) References Cited

U.S. PATENT DOCUMENTS

| | | | | |
|---|---|---|---|---|
| 4,932,042 A | * | 6/1990 | Baral et al. ............... 379/88.24 |
| 5,036,533 A | | 7/1991 | Carter et al. ........... 379/144.01 |
| 5,103,449 A | * | 4/1992 | Jolissaint ..................... 379/142 |
| 5,119,415 A | * | 6/1992 | Aoyama ..................... 379/230 |
| 5,509,062 A | * | 4/1996 | Carlsen .................. 379/211.02 |
| 5,535,264 A | * | 7/1996 | Starr et al. ................ 379/88.25 |
| 5,608,788 A | * | 3/1997 | Demlow et al. ........ 379/142.07 |
| 5,787,150 A | | 7/1998 | Reiman et al. .......... 379/88.12 |
| 6,064,874 A | * | 5/2000 | Cox et al. ................ 379/88.13 |
| 6,101,245 A | * | 8/2000 | Gilai ..................... 379/100.14 |
| 6,115,455 A | * | 9/2000 | Picard ..................... 379/88.12 |
| 6,181,703 B1 | * | 1/2001 | Christie et al. ............. 379/230 |
| 6,192,115 B1 | * | 2/2001 | Toy et al. .................... 379/130 |
| 6,289,090 B1 | | 9/2001 | Tessler et al. ......... 379/207.02 |

* cited by examiner

Primary Examiner—Fan Tsang
Assistant Examiner—Ovidio Escalante

(57) ABSTRACT

A method and apparatus to verify a dialed number is described. A request is received from a calling party to send a first call station a number sent from the first call station and associated with a second call station. The number is sent in accordance with the request.

18 Claims, 5 Drawing Sheets

METHOD AND APPARATUS FOR PROVIDING DIALED NUMBER VERIFICATION

FIELD OF THE INVENTION

The invention relates to communications in general. More particularly, the invention relates to a method and apparatus for verifying a dialed number in a communications system.

BACKGROUND OF THE INVENTION

Innovations in communications technologies have made a wide range of enhanced communications services available to a user. For example, a person can dial a telephone number at the press of a key (i.e., speed-dialing), retrieve a telephone number for a missed call, view a telephone number of an incoming call on a display (i.e., caller identification or "caller ID"), and send or retrieve a voice message. A communications provider often provides these services through a network such as an intelligent services network (ISN) that is privately owned but that works in conjunction with the public switched telephone network (PSTN). These services can also be offered by a dedicated device located at the customer premise, such as a telephone with advanced electronics or a telephone answering machine (collectively referred to as Customer Premise Equipment or "CPE").

Voice messaging in particular is an enhanced communications service that has become increasingly popular. In fact, voice mail and telephone answering machines have created a new paradigm in communications. Where once a caller was relegated to listening to unanswered rings on a telephone, when a messaging system is available the caller can now leave a message for the called party with pertinent information. In cases where time is a factor, it is sometimes more convenient to actually leave a voice message than to speak directly with a called party. In operation, a voice messaging service or answering machine typically picks up the call, plays a greeting message, and guides the calling party through the message creation process.

One problem associated with communications networks in general, and voice messaging services in particular, is that there is no way for a calling party to actively request verification of a dialed number. After a calling party dials a number the calling party may become worried that they have dialed the wrong number. Since there is no way to request verification of the dialed number, the calling party must either wait for the call to be completed and attempt to ascertain the telephone number associated with the called party, or simply hang up and re-dial the number. Both alternatives are tedious and time consuming. With respect to the latter alternative, the calling party must pay for a completed call to make this determination without any assurance that the dialed number will be verified.

This is particularly problematic with voice messaging services. When a voice messaging service answers the call, many callers suddenly become concerned that they dialed the wrong number and are therefore afraid to leave a message. Unless the greeting message actually contains the dialed telephone number, which is relatively rare, the caller has no idea as to whether they have called the correct number. For example, callers who hear only "please leave a message" are often left doubting whether they dialed the correct number. Even if the dialed number is included as part of the greeting message, it is often embedded somewhere within the greeting message. This may require the caller to wait for the entire greeting message to be played before finding out that the wrong number was dialed, if ever. Furthermore, CPE devices are often of poor quality so the recorded message can be difficult to understand.

There are a number of devices that display or audibly recite a number for the call participants, such as caller ID devices or telephones with visual displays that display the numbers entered into the telephone. These devices, however, are less than satisfactory for a number of reasons. For example, caller ID is a CPE device for displaying a telephone number of the calling party for the called party. This function does not solve the problem of displaying the dialed number for the calling party, but rather operates in reverse by serving the called party. With respect to telephones with visual displays, such telephones are relatively expensive and therefore not available in a large number of households or offices.

In view of the foregoing, it can be appreciated that a substantial need exists for a messaging system which solves the above-discussed problem.

SUMMARY OF THE INVENTION

One embodiment of the invention includes a method and apparatus to verify a dialed number. A request is received from a calling party to send a first call station a number sent from the first call station and associated with a second call station. The number is sent in accordance with the request.

Another embodiment of the invention includes a method and apparatus to deliver a dialed number to a calling party over a network. A first call station is connected to a messaging platform to create a message for a second call station. A determination is made as to whether to send the first call station a number associated with the second call station. The number is sent to the first call station in accordance with the determination.

With these and other advantages and features of the invention that will become hereinafter apparent, the nature of the invention may be more clearly understood by reference to the following detailed description of the invention, the appended claims and to the several drawings attached herein.

DETAILED DESCRIPTION

The embodiments of the invention comprise a method and apparatus to perform dialed number verification for a calling party at the request of the calling party. This is useful if during the call connection phase the calling party desires verification of the dialed number. It is also useful to verify the dialed number prior to leaving a voice message for the called party. In one embodiment of the invention, the calling party can verify the dialed number by pressing a designated key or sequence of keys (e.g., the "*" key or "*345" keys) on the telephone keypad at any time during the call connection process. In another embodiment of the invention, the messaging system provides an automatic recitation of the dialed telephone number prior to allowing a message to be created. In yet another embodiment of the invention, the messaging system provides an option list activated by pressing specific digits associated with the options to allow for confirming the number dialed prior to allowing a message to be created.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
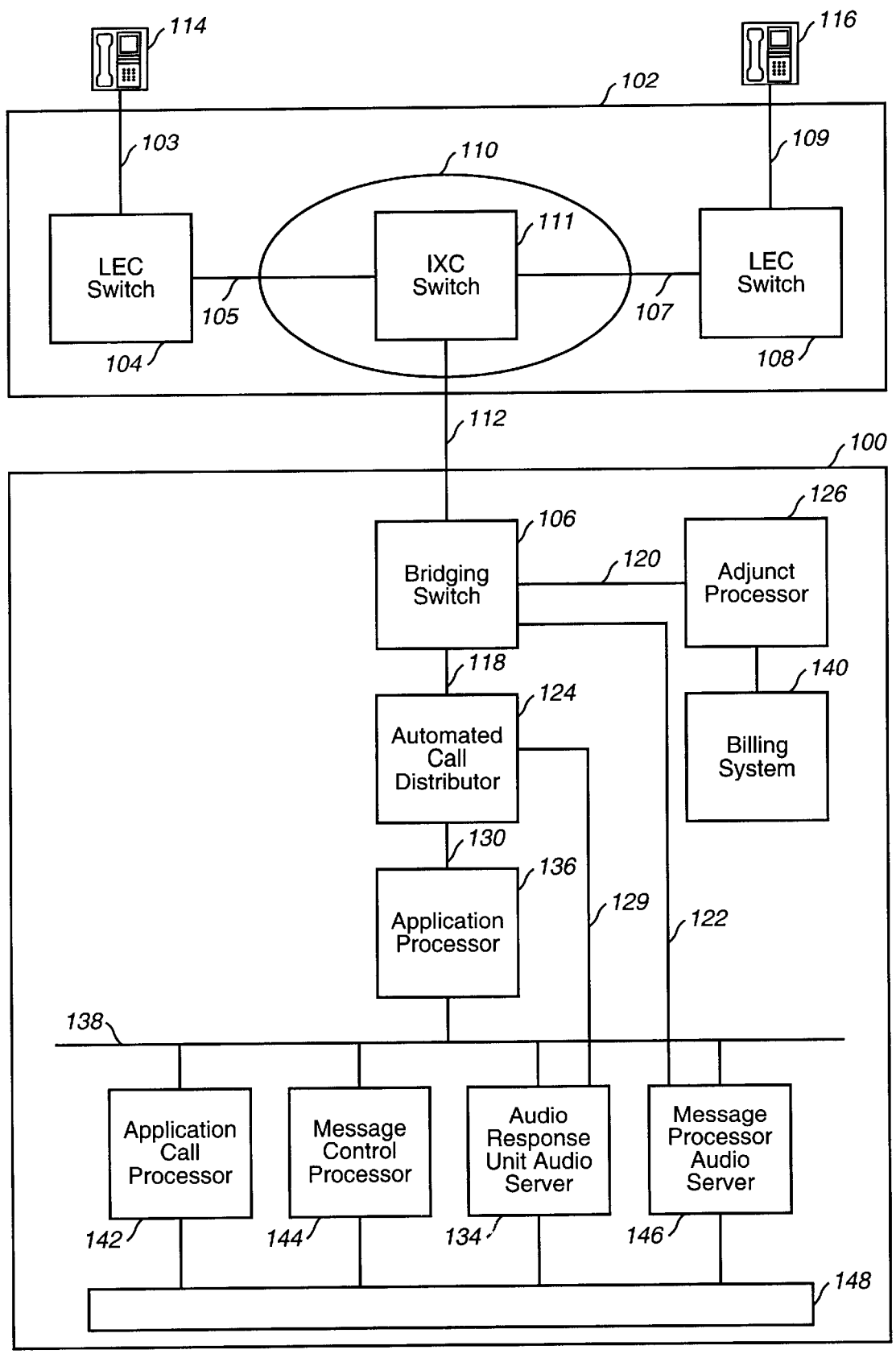
FIG. 1 a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of a voice messaging system 100 connected to a network 102. In this embodiment of the invention, telephone sets 114 and 116 are connected to a network 102 via lines 103 and 109, respectively. Network 102 is connected to a voice messaging network 100 via trunk 112. Although a particular system configuration is shown in FIG. 1, it can be appreciated that a network and voice messaging system can be configured in many different ways, and that the system shown in FIG. 1 is merely an example of one particular configuration.

In this embodiment of the invention, network 102 is a conventional public switched telephone network (PSTN). As an example, the internal details of network 102 are represented by a pair of local exchange carrier (LEC) switches 104 and 108, respectively, connected to an interexchange carrier (IXC) network 110 by trunk lines 105 and 107, respectively. Network 110 is a typical IXC network that includes, for example, an IXC switch 111.

System 100 includes a bridging switch 106, connected to network 102 by trunk 112. Bridging switch 106 allows a call to be simultaneously connected among three parties. In addition to connections over trunk 112, bridging switch 106 connects to an automatic call distributor (ACD) 124 over line 118, and a messaging platform audio server (MP-AS) 146 over line 122. ACD 124 routes calls for handling by an automated audio response unit/audio server (ARU-AS) 134 using information from an application processor (APP) 136 provided to ACD 124 over data connection 130. ACD 124 delivers the call for processing by ARU-AS 134 over audio connection 129.

ARU-AS 134 includes, among other things, an audio interface for the calling party, and computer program instructions and hardware that provide the functionality of a speech synthesis unit (SSU), a dual-tone multifrequency (DTMF) detector and a speech recognition detector (SRD). ARU-AS 134 automatically answers calls and obtains information from the caller. ARU-AS 134 does this by, for example, playing pre-recorded prompting messages to the caller via the SSU, and detecting touch tone keys (i.e., DTMF tones using the DTMF detector) pressed by the caller in response. Alternatively, the user can simply speak a menu option (e.g., "verify dialed number") into the telephone handset. The spoken commands are received, parsed and interpreted by, for example, the SRD, and the option is selected accordingly. ARUAS 134 includes an audio server which digitally records, stores and plays back voice messages.

An application call processor (ACP) 142 and a message control processor (MCP) 144 are standard processors which control different portions of the messaging process. More particularly, ACP 142 and MPC 144 implement portions of the processes which perform a voice messaging service. ACP 142 receives status information from ARU-AS 134 and MP-AS 146 and issues commands to control both ARU-AS 134 and MP-AS 146 in the performance of voice messaging services. ARU-AS 134 is connected to ACD 124 and handles incoming calls to the system. MP-AS 146 is an audio server similar to that in ARU-AS 134, except that it is connected to bridging switch 106 and has been arranged so that it is capable of initiating calls.

Although only single blocks are shown, system 100 and each block within represents multiple equipment located in diverse geographical locations, but all communicating over local/wide area network (LWAN) 138. LWAN 138 is a standard network comprising, for example, multiple interconnected Ethernet local area networks. ARU-AS 134, ACP 142, MCP 144 and MP-AS 146 also communicate over local area network (LAN) 148. LAN 148 is a standard network, such as Token Ring. Although it is not required, typically, each group of ARU-AS 134, ACP 142, MCP 144 and MP-AS 146 are located at the same site, so LAN 148 is used to interconnect them. The use of LAN 148 allows the bulk of messaging traffic to be intercommunicated without use of LWAN 138. Messaging traffic comprises mainly digitized voice messages, which tend to comprise large amounts of data compared to the usual signaling traffic on LWAN 138. Intercommunicating messaging traffic over LWAN 138 would consume too many network resources. Use of LAN 148 avoids consumption of those resources and prevents any interference with signaling traffic.

Bridging switch 106 also communicates with adjunct processor (AP) 126 which extracts billing information from switch 106 over data connection 120. AP 126 processes the extracted billing information and sends it to billing system 140.

Figure 2:
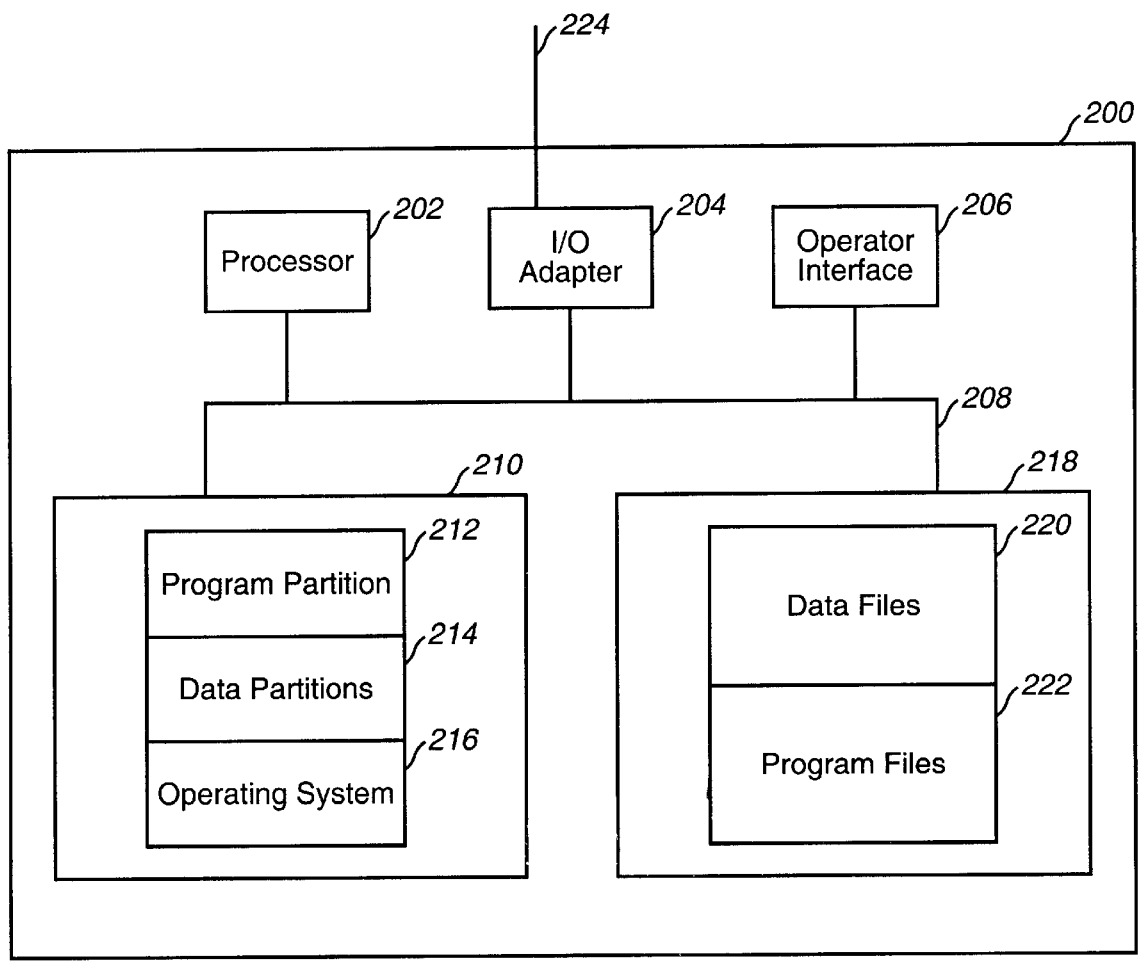
FIG. 2 is a block diagram of a computer system in accordance with one embodiment of the invention.

FIG. 2 is a block diagram of a computer system 200 which is representative of AP 126, APP 136, ACP 142, MCP 144 and a billing system 140, in accordance with one embodiment of the invention. Each of these blocks comprise at least one such computer system. Although only one each of AP 126, APP 136, ACP 142, MCP 144 and billing system 140 are shown in FIG. 1, it is well known in the art that a distributed architecture in which more than one computer system performs each function is entirely equivalent.

In one advantageous embodiment of the invention, system 200 represents a portion of a processor-based computer system. System 200 includes a processor 202, an input/output (I/O) adapter 204, an operator interface 206, a memory 210 and a disk storage 218. Memory 210 stores computer program instructions and data. Processor 202 executes the program instructions, and processes the data, stored in memory 210. Disk storage 218 stores data to be transferred to and from memory 210. I/O adapter 204 communicates with other devices and transfers data in and out of the computer system over connection 224. Operator interface 206 interfaces with a system operator by accepting commands and providing status information. All these elements are interconnected by bus 208, which allows data to be intercommunicated between the elements. I/O adapter 204 represents one or more I/O adapters or network interfaces which may connect to local or wide area networks such as, for example, LWAN 138, LAN 148 or directly to other components. Therefore, connection 224 represents a LAN or WAN or a direct connection to other equipment.

Processor 202 can be any type of processor capable of providing the speed and functionality required by the embodiments of the invention. For example, processor 202 could be a processor from the Pentium® family of processors made by Intel Corporation, or any of a variety of general purpose processors made by Motorola.

For purposes of this application, memory 210 and disk 218 are machine readable mediums and could include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), and any other device that can store digital information. In one embodiment, the instructions are stored on the medium in a compressed and/or encrypted format. As used herein, the phrase "executed by a processor" and variants thereof are meant to encompass instructions stored in a compressed and/or encrypted format, as well as instructions that have to be compiled or installed by an installer before being executed by the processor. Further, system 200 may contain various combinations of machine readable storage devices through other I/O controllers, which are accessible by processor 202 and which are capable of storing a combination of computer program instructions and data.

Memory 210 is accessible by processor 202 over bus 208 and includes an operating system 216, a program partition 212 and a data partition 214. Program partition 212 stores and allows execution by processor 202 of program instructions which implement the functions of each respective system, AP 126, APP 136, ACP 142, MCP 144 and billing system 140. Data partition 214 is accessible by processor 202 and stores data used during the execution of program instructions. In AP 126, program partition 212 contains program instructions which implement extraction and processing of billing information from switch 106. In APP 136, program partition 212 contains program instructions which selects an operator group, such as ARU-AS 134, to which calls are to be routed by ACD 124. In MCP 144, program partition 212 contains program instructions which implement portions of a messaging verification process, a messaging creation process, a messaging storing process, and a messaging delivery process. In billing system 140, program partition 212 contains program instructions which implement processing of billing information.

Figure 3:
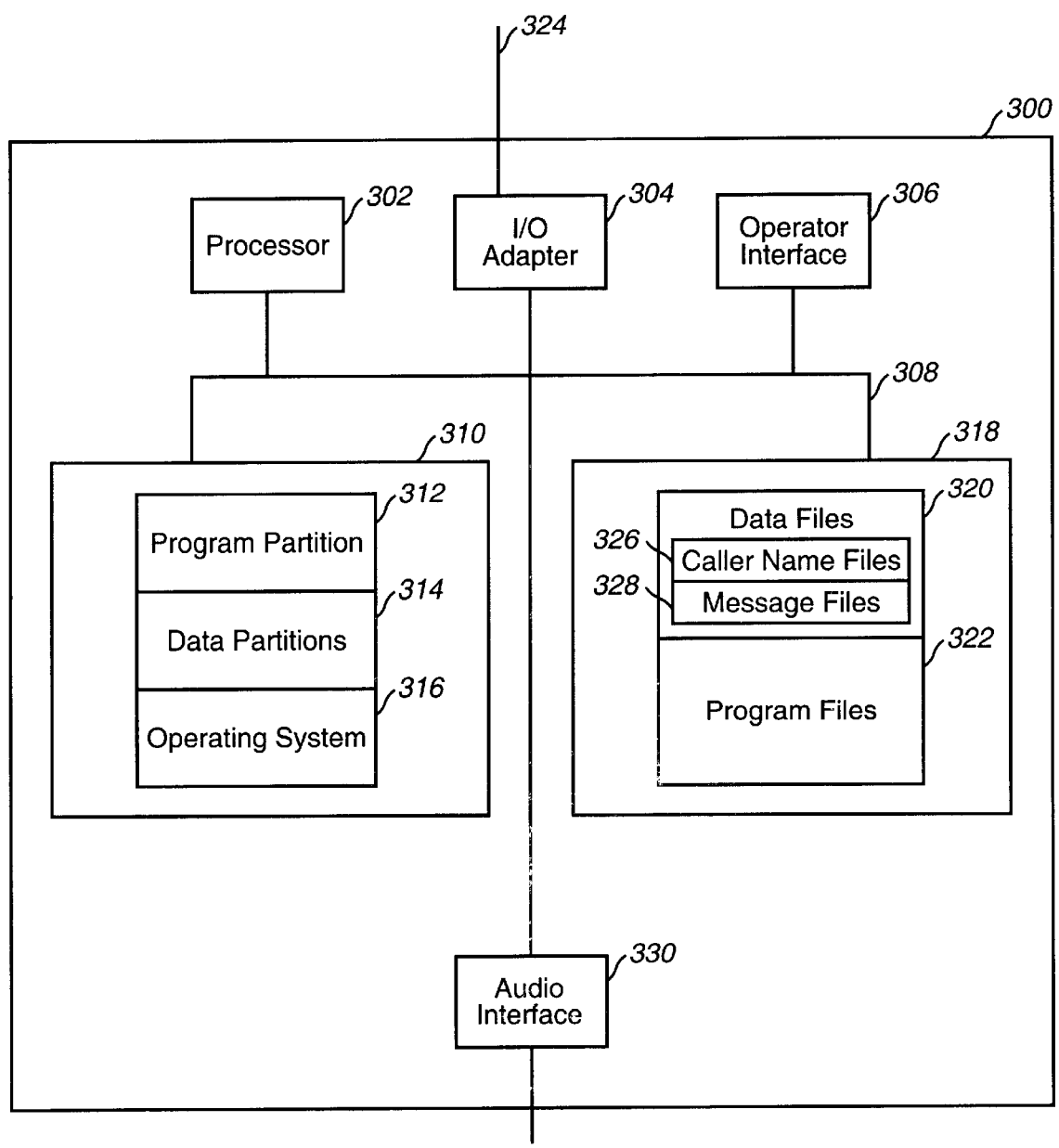
FIG. 3 is a block diagram of an audio server in accordance with one embodiment of the invention.

FIG. 3 is an exemplary block diagram of an audio server 300 which is representative of ARU-AS 134 and MP-AS 146. Each of these blocks comprise at least one such audio server. Although only one each of ARU-AS 134 and MP-AS 146 are shown in FIG. 1, it is well known in the art that a distributed architecture in which more than one audio server performs each function is entirely equivalent.

In one advantageous embodiment of the invention, system 300 represents a portion of a processor-based computer system. System 300 includes a processor 302, an input/output (I/O) adapter 304, an operator interface 306, a memory 310, a disk storage 318, and at least one audio interface 330. In this embodiment of the invention, system 200 is similar to system 300, with the addition of audio interface 330 and specific program instructions and data stored in memory 310 and 318. Therefore, elements 302, 304, 306, 308, 310, 318 and 324 as discussed with reference to FIG. 3, are similar in structure and function to elements 202, 204, 206, 208, 210, 218 and 224 as discussed with reference to FIG. 2.

Audio server 330 communicates audio signals for computer 300. Audio interface 330 interfaces audio server 300 to audio trunk lines, typically at least one T1 line. Each T1 line is capable of carrying 24 calls. Audio server 300 typically has the throughput necessary to handle 72 calls simultaneously, therefore, three T1 lines would be connected to each audio interface 330.

Memory 310 is accessible by processor 302 over bus 308 and includes an operating system 316, a program partition 312 and a data partition 314. Program partition 312 stores and allows execution by processor 302 of program instructions which implement the functions of each respective system, ARU-AS 134 and MP-AS 146. Data partition 314 is accessible by processor 302 and stores data used during the execution of program instructions. In ARU-AS 134, program partition 312 contains program instructions which implement portions of conventional voice messaging, the SSU, the DTMF detector, the SRD, and portions of a dialed number verification process (as described with reference to FIG. 4). In MP-AS 146, program partition 312 contains program instructions which also implement portions of conventional voice messaging services as well as portions of the dialed number verification process, as also described below. It can be appreciated that although the program instructions for the dialed number verification process is implemented in ARU-AS 134 and/or MPAS 146 as described herein, this functionality can be implemented anywhere in the communication path between the first call station, the second call station, and the messaging platform (e.g., network 102 and system 100), and still fall within the scope of the invention.

Disk 318 contains data files 320. These files are used for voice message storage. Files 320 include caller name files 326 and message files 328. These files contain digital recordings of callers' names and voice messages respectively. Disk 318 also includes program files 322 as necessary or desired for a particular application.

Figure 4:
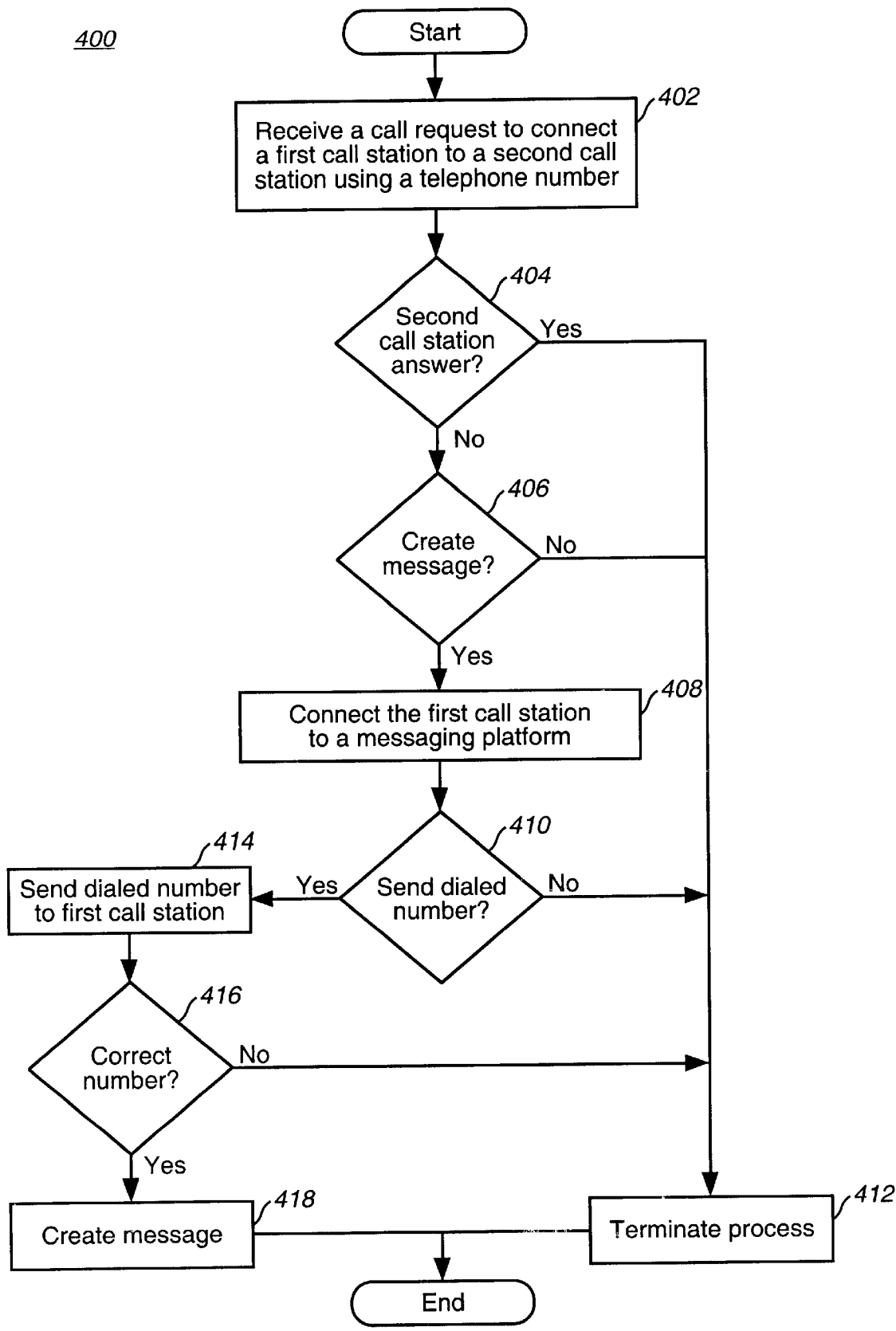
FIG. 4 is a block flow diagram of the steps performed by a dialed number verification module in accordance with one embodiment of the invention.
Figure 5:
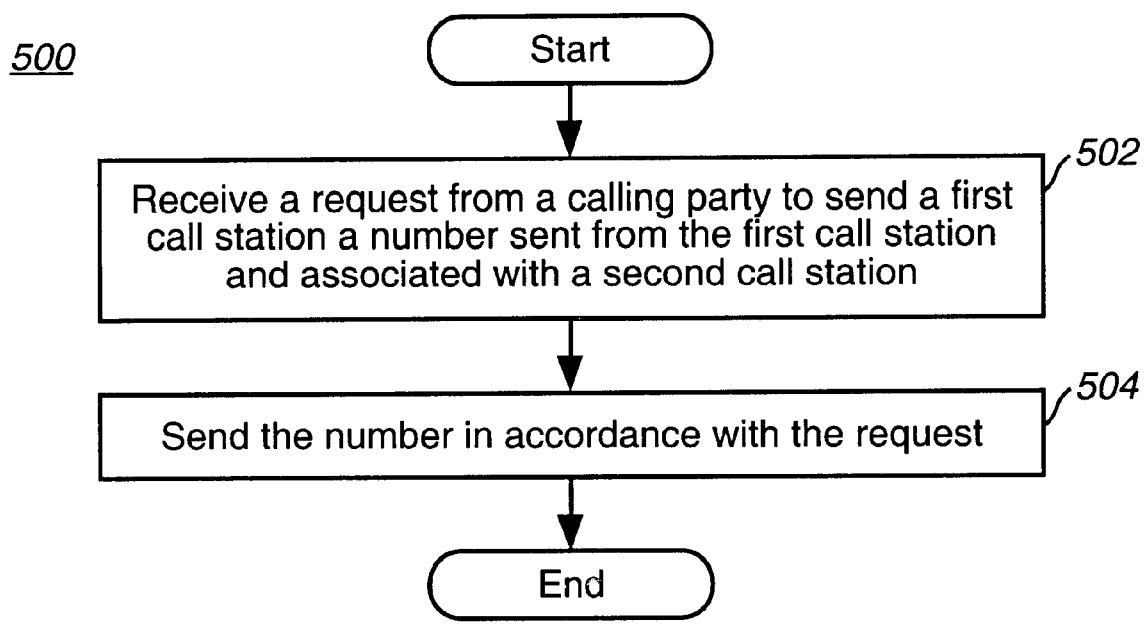
FIG. 5 is a block flow diagram of the steps performed by a dialed number verification module in accordance with another embodiment of the invention.

The operation of systems 100, 200 and 300 will be described in more detail with reference to FIGS. 4 and 5. Although FIGS. 4 and 5 presented herein include a particular sequence of steps, it can be appreciated that the sequence of steps merely provides an example of how the general functionality described herein can be implemented. Further, each sequence of steps do not have to be executed in the order presented unless otherwise indicated.

FIG. 4 is a block flow diagram for the steps performed by a dialed number verification module in accordance with one embodiment of the invention. The term "dialed number verification module" refers to the software and/or hardware used to implement the functionality for dialed number verification as described herein. In this embodiment of the invention, the dialed number verification is performed by ARU-AS 134. It can be appreciated, however, that this functionality can be implemented by any device, or combination of devices, located anywhere inside or outside of a communication network, such as within CPE, and still fall within the scope of the invention.

In general, FIG. 4 illustrates a dialed number verification process 400 wherein a first call station is connected to a messaging platform to create a message for a second call station. A determination is made as to whether to send the first call station a number associated with the second call station. The number is sent to the first call station in accordance with the determination.

A first call station is connected to a messaging platform to create a message for a second call station. A call request to connect a first call station to a second call station using the telephone number is received at step 402. A determination is made as to whether the second call station answers the call request at step 404. If the second call station answers at step 404, the process is terminated at step 412. If the second call station does not answer at step 404, a determination is made as to whether the first call station will create a message for the second call station at step 406. If the first call station will not create a message for the second call station at step 406, then the process is terminated at step 412. If the second call station will create a message for the second call station at step 406, the first call station is connected to the messaging platform at step 408.

Once the first call station is connected to the messaging platform at step 408, a determination is made as to whether to send the first call station a number associated with the second call station. In one embodiment of the invention, a dialed number verification request is sent to the first call station. The dialed number verification request is delivered in the form of an audio menu, with one option presented as part of the audio menu being whether the calling party using the first call station would like to have the dialed number audibly read back to the first call station. The calling party would then press a key on the keypad of the first call station corresponding to the menu option for dialed number verification. The response from the first call station is received by the messaging platform and indicates whether to send the first call station the number from the first call station. A determination is made as to whether to send the first call station the number in accordance with the response.

In another embodiment of the invention, the determination as to whether to send the first call station a number associated with the second call station is performed by accessing a user profile associated with the first call station and having a predetermined dialed number verification response. Prior to dialing the telephone number for the second call station, the calling party associated with the first call station could connect to the messaging platform and set a number of user options available to the calling party. One such option would be to automatically verify a telephone number received from the first call station prior to creating a message for the called party associated with the telephone number. Alternatively, the calling party could prevent automatic dialed number verification prior to creating a message for the called party. For example, the calling party may have a telephone with a visual display and therefore would not desire to use an automatic dialed number verification service. Once the dialed number verification option is set, the messaging platform would make the determination as to whether to send the first call station the number in accordance with this option.

In yet another embodiment of the invention, the determination as to whether to send the first call station a number associated with the second call station is performed by accessing a system profile associated with the messaging platform and having a predetermined dialed number verification response. The messaging platform may have a default system setting to automatically recite the dialed number prior to creating a voice message for the called party associated with the dialed number. The determination as to whether to send the first call station the number in accordance with the system setting.

In a different embodiment of the invention, the determination as to whether to send the first call station a number associated with the second call station is performed by accessing a user profile associated with the second call station and having a predetermined dialed number verification response. Prior to dialing the telephone number for the second call station, the called party associated with the second call station could connect to the messaging platform and set a number of user options available to the called party. One such option would be to automatically verify a telephone number received from the first call station prior to creating a message for the called party associated with the telephone number. Alternatively, the called party could prevent confirmation of its telephone number prior to the calling party leaving a message. One reason for this could be for security or privacy concerns. Once the dialed number verification option is set, the messaging platform would make the determination as to whether to send the first call station the number in accordance with this option.

Once the determination is made to send the dialed number to the first call station at step 410, the dialed number is sent to the first call station at step 414. In one embodiment of the invention, the number is retrieved and sent to the first call station using a network such as the PSTN. The number can be retrieved a number of different ways, including receiving the dialed number with a message creation request at the messaging platform, storing the number in memory, and retrieving the number from the memory when needed. The number can also be retrieved by sending a number request to a device storing the number, and receiving the number from the device. One example of such a device would be a device providing dialed number identification services (DNIS).

Once the dialed number has been sent to the first call station at step 414, the caller using the first call station can verify or confirm that the dialed number was correctly entered into the telephone set at step 416. If the dialed number is not correct at step 416, the process is terminated at step 412. If the dialed number is correct at step 416, the message for the second call station is created at step 418 using conventional voice messaging techniques.

Once the dialed number has been verified for the calling party, a record of the transaction is sent to a billing system. The billing system then records the transaction as part of its billing database, and bills the calling party accordingly using conventional billing techniques.

In one embodiment of the invention, the messaging platform is part of an intelligent services network such as system 100. In another embodiment of the invention, the messaging platform is comprised of CPE, such as a telephone answering machine. It can be appreciated, that any device capable of creating, storing and delivering a message can operate as a messaging platform as used herein, and still fall within the scope of the invention.

The operation of system 100 and the flow diagram shown in FIG. 4 can be better understood by way of example. A first person uses telephone set 114 to call a second person at telephone set 116 via PSTN 102. The first person dials the telephone number for telephone set 116. Network 102 attempts to open a call connection to telephone set 116. If telephone set 116 does not answer the call, either due to ring-no-answer, a busy signal, or pre-configuration for automatic messaging (e.g., called party is away on vacation), network 102 routes the call to system 100 and invokes the messaging process. Alternatively, the calling party can request dialed number verification at any time during the call process by simply pressing a designated key on the telephone set 114 keypad (e.g., the "*" key) as discussed below with reference to FIG. 5.

Network 102 begins the messaging process by routing the call to bridging switch 106. Bridging switch 106 routes the call to ACD 124. ACD 124 sends the signaling information, including the terminating number (i.e., dialed number), associated with the call to APP 136, which selects an operator group such as ARU-AS 134, to which the call is to be routed. Alternatively, the terminating number can be retrieved by ARU-AS 134 from a profile associated with the calling party, the called party, or the messaging platform itself. It can be appreciated that each profile can be stored anywhere in the communication path between telephone set 114, telephone set 116, network 102 or system 100, and still fall within the scope of the invention. APP 136 then sends the routing command to ACD 124, which then routes the call accordingly.

Once the call is routed to ARU-AS 134 it prompts the caller to use the messaging service. ARU-AS 134 determines whether the caller accepts the messaging service. If not, the call is terminated. If the caller accepts messaging service, ARU-AS 134 provides a list of options available to the caller in the form of audio menu choices, one of which is to hear the number the calling party dialed to reach telephone set 116. Alternatively, ARU-AS 134 automatically recites the dialed number subsequent to the calling party accepting messaging service via the dialed number verification response set in a profile for the calling party, called party or messaging system. If the dialed number is not the number the calling party intended to enter or dial, the calling party may terminate the message process by selecting an available option or simply hanging up the handset of telephone set 116. The calling party may also be given the option to dial a new number. If the dialed number is the number the calling party intended to enter, the calling party is directed to leaving a message using conventional message creation, storage and delivery techniques.

Once the dialed number is verified by the calling party, some indicia of the dialed number verification transaction is sent to billing system 140. Billing system 140 receives the indicia and updates the billing record for the calling party in its billing database. Billing system 140 bills the customer for the transaction accordingly.

FIG. 5 is a block flow diagram of the steps to perform dialed number verification in accordance with another embodiment of the invention. FIG. 5 illustrates a dialed number verification process 500. At step 502, a request is received from a calling party to send a first call station a number sent from the first call station and associated with a second call station. The number is sent in accordance with the determination at step 504.

In one embodiment of the invention, a determination is made as to whether a first call request to connect the call station with the second call station is active. The first call request is terminated in accordance with the determination prior to sending the first call station the number.

After the first call request is terminated and the number has been sent to the first call station, a reconnect request is sent to the first call station. A response to the reconnect request is received. A second call request to connect the first call station with the second call station is sent. The call request can utilize either the number sent to the first call station, or a new number designated by the calling party using the first call station.

The number can be sent to the first call station in a number of different ways. For example, the number can be converted to audio form and audibly recited to the calling party. If the first call station has a display associated with it, such as a caller identification device, the number can be sent to the display for visual confirmation by the calling party.

The operation of system 100 and the flow diagram shown in FIG. 5 can be better understood by way of example. A first person uses telephone set 114 to call a second person at telephone set 116 via PSTN 102. The first person dials the telephone number for telephone set 116. Network 102 attempts to open a call connection to telephone set 116. Telephone set 116 rings to indicate an incoming call to the second person. The first person, meanwhile, hears a tone corresponding to the ring signal sent to telephone set 116 during the call connection phase.

While waiting for the second person to answer the call using telephone set 116, the first person desires to verify the number entered into telephone set 114 to initiate the call. The first person presses a pre-configured key on the number keypad such as "*" that initiates a tone intercept to request verification of the dialed number. Telephone set 114 sends the dialed number verification request to network 102, which is routed to ARU-AS 134. ARU-AS 134 retrieves the dialed number from network 102, bridging switch 106 or a DNIS. ARU-AS 134 then sends the dialed number to telephone set 114 either in audio form (e.g., reciting the number using a voice synthesizer), or as data to be displayed on a display device such as a caller identification device.

Prior to sending the dialed number to telephone set 114, network 102 may terminate the call request to telephone set 116. In this manner, telephone set 116 will not be answered by the second person or a messaging device and thus interfere with the dialed number verification service being provided to the first person using telephone set 114. Once the dialed number is sent to telephone set 114, ARU-AS 134 sends a reconnect request to telephone set 114. The reconnect request can be presented to the first person as an audio menu of options, one of which is redial the initially dialed number or leave a message via messaging platform 100. If the dialed number as recited to the first person is incorrect, that is, the dialed number does not match the telephone number associated with telephone set 116, the first person may be prompted to enter the correct number to initiate a new call request. If the first person desires to leave a message, the appropriate key is pressed and telephone set 114 is connected to messaging platform 100 to leave a message using conventional messaging techniques.

Once the dialed number is verified by the calling party, some indicia of the dialed number verification request transaction is sent to billing system 140. The indicia can be sent from the messaging platform or some other network device. Billing system 140 receives the indicia and updates the billing record for the calling party in its billing database. Billing system 140 bills the customer for the transaction accordingly.

Although various embodiments are specifically illustrated and described herein, it will be appreciated that modifications and variations of the present invention are covered by the above teachings and within the purview of the appended claims without departing from the spirit and intended scope of the invention. For example, although a network voice messaging service was used in the above example, it can be appreciated that a conventional telephone answering machine may be configured to, automatically or by option list, recite the dialed number to the calling party without the need for a user to pre-record the number in an answering message, and still fall within the scope of the invention. In another example, although the embodiments of the invention implement the functionality of the processes described herein in software, it can be appreciated that the functionality of these processes may be implemented in hardware, software, or a combination of hardware and software, using well-known signal processing techniques. In yet another example, the embodiments were described using network 102 and system 100. A communication network, however, can utilize an infinite number of network devices configured in an infinite number of ways. Network 102 is merely used by way of example, and is not meant to limit the scope of the invention. It can be appreciated that the dialed number verification functionality described herein can be implemented in any type of communication network, or anywhere in the communication path between the first and second call stations, and still fall within the scope of the invention. Moreover, system 100 is representative of a messaging platform suitable for use with one embodiment of the invention. It can be appreciated, however, that any network device can be configured to perform the functionality described herein, and still fall within the scope of the invention.

What is claimed is:

1. A method of delivering a dialed number to a calling party over a network, comprising:
   connecting a first call station used by said calling party to a voice mail messaging platform to create a message for a second call station;
   determining, by the voice mail messaging platform, whether to send said first call station a number associated with said second call station; and
   sending said number to said first call station in accordance with said determination,
   wherein said determining comprises:
      accessing a user profile associated with said first call station and having a predetermined dialed number verification response; and
      determining whether to send said first call station said number in accordance with said response.

2. The method of claim 1, wherein said connecting comprises:
   receiving a call request to connect said first call station to said second call station using said number;
   determining whether said second call station answers said call request;
   determining whether to create a message for said second call station if said second call station does not answer said call request; and
   connecting said first call station to said message platform if said first call station is to create said message.

3. The method of claim 1, wherein said sending comprises:
   retrieving said number; and
   sending said number to first call station over a public switched telephone network.

4. The method of claim 3, wherein said retrieving comprises:
   receiving a message creation request having said number at said messaging platform;
   storing said number in memory; and
   retrieving said number from said memory.

5. The method of claim 3, wherein said retrieving comprises:
   sending a number request to a device storing said number; and
   receiving said number from said device.

6. The method of claim 1, wherein said device provides dialed number identification services.

7. The method of claim 1, wherein said messaging platform is part of an intelligent services network.

8. The method of claim 1, wherein said messaging platform comprises customer premise equipment.

9. The method of claim 8, wherein said customer premise equipment comprises a telephone answering machine.

10. A machine-readable medium whose contents cause a computer to:
    deliver a dialed number to a calling party over a network to connect a first call station to a second call station, comprising:
       connecting said first call station voice mail to a messaging platform connected to said network to create a message for said second call station;
       determining by the voice mail messaging-platform, whether to send first call station a number associated with said second call station; and
       sending said number to said first call station in accordance with said determination,
       wherein said determining comprises:
          accessing a user profile associated with said first call station and having a predetermined dialed number verification response; and
          determining whether to send said first call statiom said number in accordance with said response.

11. The machine-readable medium of claim 10, wherein said connecting comprises:
    receiving a call request to connect a first call station to said second call station using said number;
    determining whether said second call station answers said call request;
    determining whether to create a message for said second call station if said second call station does not answer said call request; and
    connecting said first call station to said messaging platform if said first call station is to create said message.

12. The machine-readable medium of claim 10, wherein said sending comprises:
    retrieving said number; and
    sending said number to said first call station using a public switched telephone network.

13. The machine-readable medium of claim 12, wherein said retrieving comprises:
    receiving a message creation request having said number at said messaging platform;
    storing said number in memory; and
    retrieving said number from said memory.

14. The machine-readable medium of claim 12, wherein said retrieving comprises:
    sending a number request to a device storing said number; and
    receiving said number from said device.

15. A method of delivering a dialed number to a calling party over a network, comprising:
    connecting a first call station used by said calling party to a voice mail messaging platform to create a message for a second call station;
    sending a dialed number verification request to said first call station;
    receiving a response to said dialed number verification request indicating whether to send said first call station a number associated with said second call station;
    determining, by the voice mail messaging platform, whether to send said first call station said number in accordance with said response;
    sending said number to said first call station in accordance with said determination; and sending indicia of said dialed number verification request to a billing system.

16. The method of claim 15, further comprising:

recording said dialed number verification request by said billing system; and billing said request to the calling party.

17. A machine-readable medium whose contents cause a computer to deliver a dialed number to a calling party over a network to connect a first call station to a second call station, the delivery of the dialed number comprising:

connecting said first call station to a voice mail messaging platform connected to said network to create a message for said second call station;

sending a dialed number verification request to said first call station;

receiving a response to said dialed number verification request indicating whether to send said first call station a number associated with said second call station;

determining, by the voice mail messaging platform, whether to send said first call station said number in accordance with said response;

sending said number to said first call station in accordance with said determination; and sending indicia of said dialed number verification request to a billing system.

18. The machine-readable medium of claim 17, further comprising:

recording said request by said billing system; and billing said request to the calling party.

* * * * *